(12) United States Patent
Imai et al.

(10) Patent No.: US 10,302,000 B2
(45) Date of Patent: *May 28, 2019

(54) EXHAUST GAS CONTROL SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Daichi Imai, Sunto-gun (JP); Hiromasa Nishioka, Susono (JP); Kiyoshi Fujiwara, Susono (JP); Yoshio Yamashita, Susono (JP); Kouta Tanaka, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 161 days.

This patent is subject to a terminal disclaimer.

(21) Appl. No.: 15/416,235

(22) Filed: Jan. 26, 2017

(65) Prior Publication Data

US 2017/0211451 A1 Jul. 27, 2017

(30) Foreign Application Priority Data

Jan. 27, 2016 (JP) ................................ 2016-013581

(51) Int. Cl.
 *F01N 9/00* (2006.01)
 *B01D 46/00* (2006.01)
 (Continued)

(52) U.S. Cl.
 CPC ......... *F01N 9/002* (2013.01); *B01D 46/0061* (2013.01); *F01N 3/021* (2013.01);
 (Continued)

(58) Field of Classification Search
 None
 See application file for complete search history.

(56) References Cited

U.S. PATENT DOCUMENTS

2003/0200746 A1 10/2003 Saito et al.
2004/0055287 A1* 3/2004 Sato .................... F01N 3/0231
 60/297

(Continued)

FOREIGN PATENT DOCUMENTS

GB 2496876 A 5/2013
JP 2003-184536 A 7/2003

(Continued)

OTHER PUBLICATIONS

Notice of Allowance issued in U.S. Appl. No. 15/416,428 dated Jan. 17, 2019.

*Primary Examiner* — Amber R Orlando
(74) *Attorney, Agent, or Firm* — Finnegan, Henderson, Farabow, Garrett & Dunner, LLP

(57) ABSTRACT

An exhaust gas control system for an internal combustion engine, before execution of a filter regeneration process, executes a pre-regeneration process that is a process of raising a temperature of a filter to a second target temperature lower than a first target temperature and increasing the concentration of $NO_2$ contained in exhaust gas flowing into the filter for a predetermined period. An execution time of the filter regeneration process when a physical quantity that correlates with a speed of change in a detected value of a differential pressure sensor during execution of the pre-regeneration process is large is shorter than an execution time of the filter regeneration process when the physical quantity is small.

5 Claims, 11 Drawing Sheets

(51) Int. Cl.
  *B01D 46/44* (2006.01)
  *B01D 46/46* (2006.01)
  *F01N 3/021* (2006.01)
  *F01N 3/023* (2006.01)
  *F01N 3/031* (2006.01)
  *F01N 3/035* (2006.01)
  *F02D 41/02* (2006.01)
  *F01N 11/00* (2006.01)
  *F01N 3/025* (2006.01)
  *F02D 41/14* (2006.01)
  *F01N 3/027* (2006.01)

(52) U.S. Cl.
  CPC ............ *F01N 3/023* (2013.01); *F01N 3/025* (2013.01); *F01N 3/0231* (2013.01); *F01N 3/035* (2013.01); *F01N 11/002* (2013.01); *F02D 41/025* (2013.01); *F02D 41/029* (2013.01); *F02D 41/1441* (2013.01); *F02D 41/1448* (2013.01); *B01D 46/446* (2013.01); *B01D 46/448* (2013.01); *B01D 2279/30* (2013.01); *F01N 3/027* (2013.01); *F01N 3/0253* (2013.01); *F01N 2560/06* (2013.01); *F01N 2560/08* (2013.01); *F01N 2560/14* (2013.01); *F01N 2610/03* (2013.01); *F01N 2900/0416* (2013.01); *F01N 2900/0601* (2013.01); *F01N 2900/1404* (2013.01); *F01N 2900/1406* (2013.01); *F01N 2900/1602* (2013.01); *F01N 2900/1606* (2013.01); *F02D 2200/0812* (2013.01); *Y02T 10/26* (2013.01); *Y02T 10/47* (2013.01)

(56) References Cited

U.S. PATENT DOCUMENTS

| | | |
|---|---|---|
| 2006/0225409 A1 | 10/2006 | Kuboshima et al. |
| 2008/0196395 A1 | 8/2008 | Hashizume |
| 2009/0019831 A1 | 1/2009 | Heibel et al. |
| 2016/0222900 A1* | 8/2016 | Nishizawa ............... F01N 3/023 |

FOREIGN PATENT DOCUMENTS

| | | |
|---|---|---|
| JP | 2003-254042 | 9/2003 |
| JP | 2003-314249 | 11/2003 |
| JP | 2004-225616 A | 8/2004 |
| JP | 2005-2830 | 1/2005 |
| JP | 2005-48709 | 2/2005 |
| JP | 2010-534290 | 11/2010 |
| JP | 2011-169235 | 9/2011 |

* cited by examiner

SOOT HAVING LARGE NUMBER OF LATTICE DEFECTS

SOOT HAVING SMALL NUMBER OF LATTICE DEFECTS

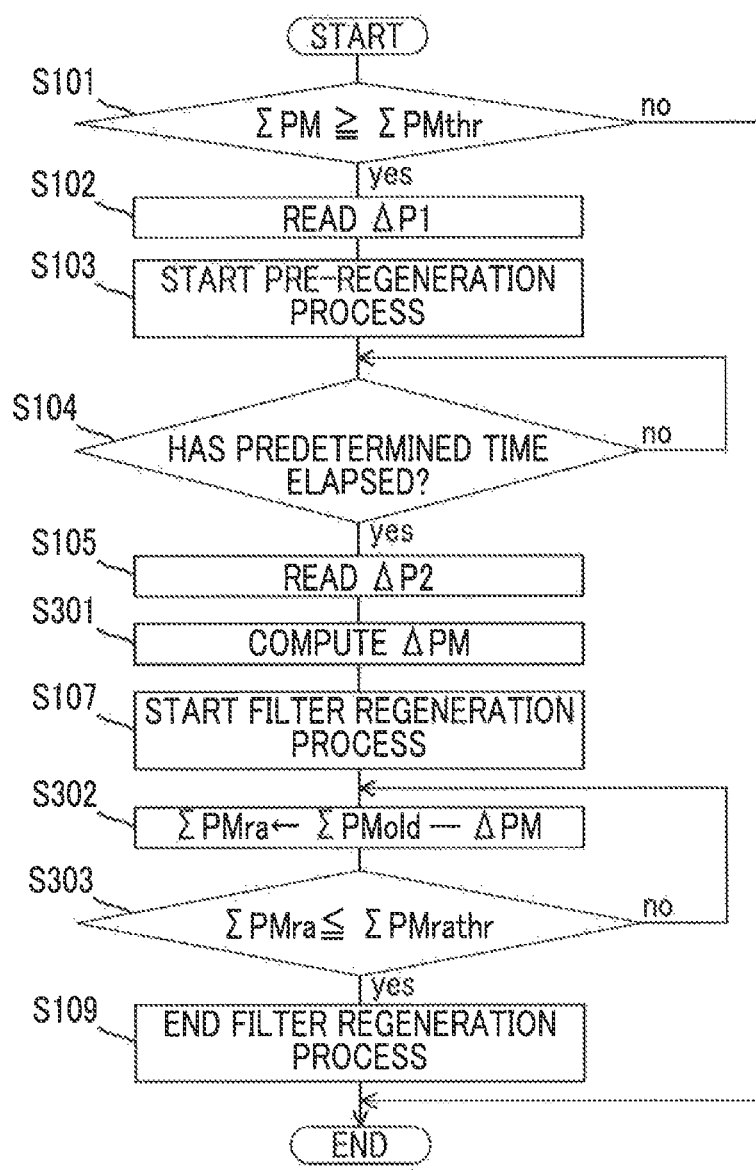

EXHAUST GAS CONTROL SYSTEM FOR INTERNAL COMBUSTION ENGINE

INCORPORATION BY REFERENCE

The disclosure of Japanese Patent Application No. 2016-013581 filed on Jan. 27, 2016 including the specification, drawings and abstract is incorporated herein by reference in its entirety.

BACKGROUND

1. Technical Field

An exhaust gas control system for an internal combustion engine is provided in the disclosure.

2. Description of Related Art

In an internal combustion engine mounted on a vehicle, or the like, there is known a technique for arranging a filter in an exhaust passage of the internal combustion engine in order to reduce emissions of particulate matter, emitted from the internal combustion engine, into the atmosphere. As a particulate matter accumulation amount in such a filter excessively increases, a pressure loss in the filter becomes excessive, with the result that back pressure that acts on the internal combustion engine increases. For this reason, when the difference (upstream-downstream differential pressure) between an exhaust pressure upstream of the filter and an exhaust pressure downstream of the filter is larger than or equal to a predetermined threshold, it is required to execute a process (filter regeneration process) for oxidizing and removing particulate matter accumulated in the filter by raising the temperature of the filter to high temperature and making the surroundings of the filter in an oxygen excessive state as needed.

The particulate matter that accumulates in the filter contains soluble organic fraction and soot. Even when the amount of particulate matter accumulated in the filter remains unchanged, the upstream-downstream differential pressure can vary depending on the ratio between the amount of soluble organic fraction and the amount of soot. For this reason, there is known the following method (see, for example, Japanese Patent Application Publication No. 2011-169235 (JP 2011-169235 A). In the method, a preprocess of oxidizing and removing soluble organic fraction accumulated in the filter by raising the temperature of the filter to a temperature at which soluble organic fraction oxidizes is initially executed, and then a process of oxidizing and removing soot accumulated in the filter by raising the temperature of the filter to a temperature at which soot is presumed to oxidize (a temperature higher than the temperature at which soluble organic fraction oxidizes) at the time when the upstream-downstream differential pressure in a state where soluble organic fraction has been removed is larger than or equal to a predetermined value is executed.

SUMMARY

Incidentally, the inventors of the present application found that the oxidation rate of soot accumulated in the filter is not uniform but the oxidation rate varies depending on the crystal structure of the soot. Because of this, if the filter regeneration process is executed without consideration of the difference in oxidization rate due to the crystal structure of soot, the execution time of the filter regeneration process can be inappropriate. For example, when the proportion of the amount of accumulated soot having such a crystal structure that the oxidation rate tends to increase is high within particulate matter accumulated in the filter, the filter regeneration process can be unnecessarily executed even after the particulate matter accumulated in the filter has been oxidized and removed. On the other hand, when the proportion of the amount of accumulated soot having such a crystal structure that the oxidation rate tends to increase is low within particulate matter accumulated in the filter, the filter regeneration process can be ended in a state where the amount of particulate matter remaining in the filter is larger than an assumed amount. If the execution time of the filter regeneration process is excessive or short in this way, it may not be possible to efficiently oxidize and remove particulate matter accumulated in the filter.

The disclosure provides an exhaust gas control system for an internal combustion engine, which executes a filter regeneration process for oxidizing and removing particulate matter accumulated in a filter provided in an exhaust passage of the internal combustion engine and which efficiently oxidizes and removes particulate matter accumulated in the filter.

The disclosure, before execution of a filter regeneration process, executes a pre-regeneration process at a temperature lower than a temperature at the time when the filter regeneration process is executed and changes an execution time of the filter regeneration process in response to a speed of change in upstream-downstream differential pressure during the pre-regeneration process.

According to one aspect of the disclosure, an exhaust gas control system for an internal combustion engine is provided. The exhaust gas control system includes a filter arranged in an exhaust passage of the internal combustion engine. The filter is configured to collect particulate matter that is emitted from the internal combustion engine. The exhaust gas control system also includes a differential pressure sensor, a temperature raising device configured to raise a temperature of the filter, and an electronic control unit. The differential pressure sensor is configured to detect an upstream-downstream differential pressure in the exhaust passage. The upstream-downstream differential pressure is a differential pressure between an exhaust pressure upstream of the filter and the exhaust pressure downstream of the filter. The electronic control unit is configured to: i) estimate a particulate matter accumulation amount that is an amount of the particulate matter collected in the filter; ii) execute a pre-regeneration process for a predetermined period when the particulate matter accumulation amount becomes larger than or equal to a predetermined threshold; and iii) execute a filter regeneration process after completion of the pre-regeneration process. The pre-regeneration process includes a process to raise the temperature of the filter by the temperature rising device to a second target temperature lower than a first target temperature. The pre-regeneration process also includes a process to increase a concentration of nitrogen dioxide contained in exhaust gas flowing into the filter by the internal combustion engine. The filter regeneration process is a process to oxidize and remove the particulate matter collected in the filter by raising the temperature of the filter by the temperature raising device to the first target temperature. The filter regeneration process is executed such that an execution time of the filter regeneration process when a speed of change in a detected value of the differential pressure sensor during execution of the pre-regeneration process is high is shorter than the execution time of the filter regeneration process when the speed of change is low.

The inventors of the present application found that soot that is easily oxidizable due to a difference in its crystal structure is contained in soot that is emitted from the internal combustion engine. Easily-oxidizable soot is presumably soot having a large number of lattice defects. Soot having a large number of lattice defects in the disclosure is soot that has not only a peak in a G-band derived from crystals but also a peak in a D-band derived from defects in a spectrum that is obtained through Raman scattering spectroscopy and of which the peak value of the D-band is larger than or equal to a predetermined value. The soot is, for example, soot like activated carbon. Hereinafter, soot having a large number of lattice defects may be referred to as defective soot.

The defective soot is more easily oxidizable than soot having a small number of lattice defects as described above. For this reason, under the same temperature condition, the oxidation rate of defective soot tends to be higher than the oxidation rate of soot having a small number of lattice defects. Thus, the amount of particulate matter that is oxidized per unit time during execution of the filter regeneration process in the case where the proportion of the amount of accumulated defective soot to the total amount of particulate matter accumulated in the filter (particulate matter accumulation amount) (hereinafter, referred to as defective soot ratio) is large tends to be larger than the amount of particulate matter that is oxidized per unit time during execution of the filter regeneration process in the case where the defective soot ratio is small. If the execution time of the filter regeneration process is set without consideration of such a situation, the execution time of the filter regeneration process can be excessively long or can be excessively short. That is, when the defective soot ratio is high, the filter regeneration process is executed even after particulate matter accumulated in the filter is oxidized and removed. This may lead to deterioration of fuel consumption rate or thermal degradation of the filter. On the other hand, when the defective soot ratio is low, the filter regeneration process is ended in a state where the amount of particulate matter remaining in the filter is larger than an assumed amount, and a pressure loss in the filter after completion of the filter regeneration process is larger than an assumed amount. This can lead to a decrease in engine output or deterioration of fuel consumption rate.

In contrast to this, an exhaust gas control system for an internal combustion engine according to the disclosure initially executes the pre-regeneration process for the predetermined period at the time when the particulate matter accumulation amount in the filter becomes larger than or equal to the predetermined threshold, and executes the filter regeneration process after completion of the pre-regeneration process. The execution time of the filter regeneration process is adjusted in response to the speed of change in the detected value (upstream-downstream differential pressure) of the differential pressure sensor during execution of the pre-regeneration process. The predetermined period is a period sufficiently shorter than a period required to execute the filter regeneration process, and is a short period to such an extent that slightest part of defective soot accumulated in the filter is oxidized. According to the findings of the inventors of the present application, defective soot is easily oxidized at a lower temperature than soot having a small number of lattice defects under the existence of $NO_2$. Thus, the amount of particulate matter that is oxidized per unit time during execution of the pre-regeneration process in the case where the defective soot ratio is large is larger than the amount of particulate matter that is oxidized per unit time during execution of the pre-regeneration process in the case where the defective soot ratio is small. Accordingly, the speed of change (the speed of deceleration) in upstream-downstream differential pressure during execution of the pre-regeneration process increases. In consideration of such a correlation, when the execution time of the filter regeneration process in the case where the speed of change in upstream-downstream differential pressure during execution of the pre-regeneration process is large is made shorter than the execution time of the filter regeneration process in the case where the speed of change in upstream-downstream differential pressure during execution of the pre-regeneration process is small. Thus, the execution time of the filter regeneration process in the case where the defective soot ratio is high is made shorter than the execution time of the filter regeneration process in the case where the defective soot ratio is low. As a result, the execution time of the filter regeneration process is set to the length suitable for the defective soot ratio of particulate matter accumulated in the filter, so it is possible to suppress an excessively long execution time or excessively short execution time of the filter regeneration process. As a result, it is possible to efficiently oxidize and remove particulate matter accumulated in the filter.

According to the above mentioned aspect, the predetermined period may be a time set in advance. The electronic control unit may be configured to calculate an amount of change in the detected value of the differential pressure sensor in the predetermined period as a physical quantity that correlates with the speed of change in the detected value of the differential pressure sensor during execution of the pre-regeneration process. The electronic control unit may be configured to execute the filter regeneration process such that the execution time of the filter regeneration process when the amount of change is large is shorter than the execution time of the filter regeneration process when the amount of change is small. With this configuration, it is possible to reduce the execution time of the pre-regeneration process to a short time as much as possible.

According to the above mentioned aspect, the predetermined period may be a period until an amount of change in the detected value of the differential pressure sensor reaches a predetermined amount set in advance. The electronic control unit may be configured to set a length of the predetermined period as a physical quantity that correlates with the speed of change in the detected value of the differential pressure sensor during execution of the pre-regeneration process. The electronic control unit may be configured to execute the filter regeneration process such that the execution time of the filter regeneration process when the length of the predetermined period is short is shorter than the execution time of the filter regeneration process when the length of the predetermined period is long. With this configuration, by setting the set amount to a value larger than variations in the amount of change in upstream-downstream differential pressure due to unevenness of the differential pressure sensor, or the like, it is possible to further accurately detect the physical quantity that correlates with the speed of change in upstream-downstream differential pressure during execution of the pre-regeneration process.

According to the above mentioned aspect, the electronic control unit may be configured to, on a basis of such a characteristic that an oxidation rate of the particulate matter accumulated in the filter when the speed of change in the detected value of the differential pressure sensor during execution of the pre-regeneration process is high is higher than the oxidation rate of the particulate matter accumulated in the filter when the speed of change is low and the oxidation rate of the particulate matter accumulated in the filter when the temperature of the filter is high is higher than the oxidation rate of the particulate matter accumulated in the filter when the temperature of the filter is low, set a relationship between the temperature of the filter and the oxidation rate of the particulate matter accumulated in the filter. The relationship may correspond to the speed of change in the detected value of the differential pressure sensor during execution of the pre-regeneration process. The electronic control unit may be configured to calculate the oxidation rate of the particulate matter when the temperature of the filter is equal to the first target temperature on the basis of the set relationship. The electronic control unit may be configured to calculate an amount of the particulate matter remaining in the filter during execution of the filter regeneration process on the basis of the oxidation rate of the particulate matter. The electronic control unit may be configured to, when the amount of the particulate matter remaining in the filter becomes smaller than or equal to a predetermined completion determination value, end the filter regeneration process. With this configuration, it is possible to set the execution time of the filter regeneration process to the length suitable for the oxidation rate of particulate matter accumulated in the filter.

When soluble organic fraction is accumulated in the filter at the time when the pre-regeneration process is executed, it is difficult for the defective soot ratio to be accurately reflected on the speed of change in upstream-downstream differential pressure in the predetermined period. More specifically, soluble organic fraction is more easily oxidizable than defective soot. For this reason, when the case where the pre-regeneration process is executed in a state where the soluble organic fraction is accumulated in the filter is compared with the case where the pre-regeneration process is executed in a state where the soluble organic fraction is not accumulated in the filter, even when the defective soot ratio is the same, the speed of change in upstream-downstream differential pressure in the predetermined period in the case where the soluble organic fraction is accumulated in the filter is higher. Thus, when the execution time of the filter regeneration process is adjusted in response to the speed of change in the detected value of the differential pressure sensor in the case where the pre-regeneration process is executed in a state where the soluble organic fraction is accumulated in the filter, the execution time can be shorter than a time suitable for the defective soot ratio.

According to the above mentioned aspect, the electronic control unit may be configured to execute a soluble organic fraction removal process before executing the pre-regeneration process as a process of oxidizing and removing soluble organic fraction accumulated in the filter by raising the temperature of the filter by the temperature raising device to a third target temperature that is a temperature that is lower than the second target temperature and at which the soluble organic fraction oxidizes. With this configuration, execution of the pre-regeneration process in a state where the soluble organic fraction is accumulated in the filter is suppressed, so it is possible to set the execution time of the filter regeneration process to the length suitable for the defective soot ratio of particulate matter accumulated in the filter. As a result, completion of the filter regeneration process in a state where the amount of particulate matter remaining in the filter is larger than an assumed amount is prevented.

According to the disclosure, in an exhaust gas control system for an internal combustion engine, which executes the filter regeneration process for oxidizing and removing particulate matter accumulated in the filter provided in the exhaust passage of the internal combustion engine, particulate matter accumulated in the filter is efficiently oxidized and removed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 12 is a flowchart that shows a process routine that is executed by an electronic control unit in the case where particulate matter accumulated in a filter is oxidized and removed in the second embodiment.

DETAILED DESCRIPTION OF EMBODIMENTS

Hereinafter, example embodiments of the disclosure will be described with reference to the accompanying drawings.

The sizes, materials, shapes, relative arrangement, and the like, of components described in the present embodiments do not intend to limit the technical scope unless otherwise specified.

Figure 1:
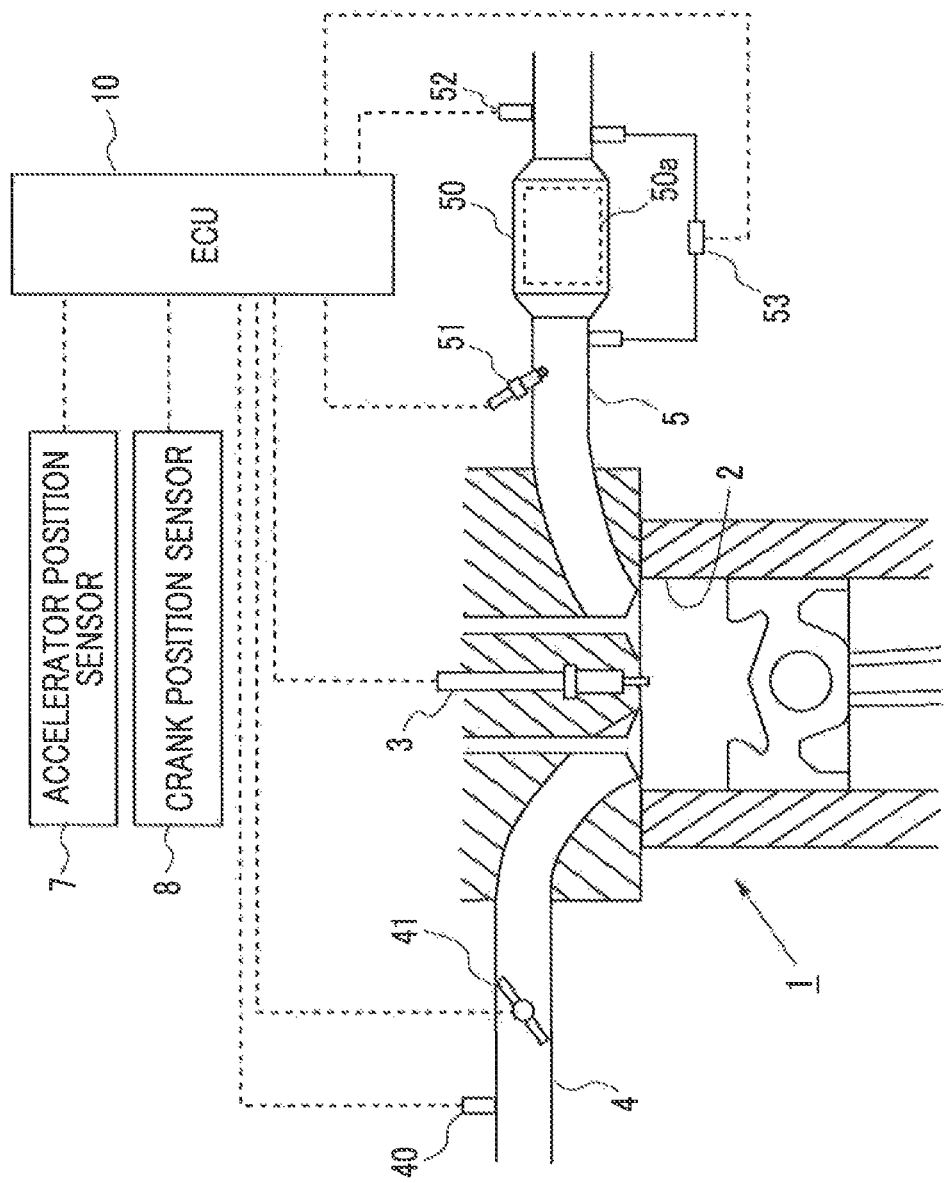
FIG. 1 is a view that shows the schematic configuration of an internal combustion engine and its intake and exhaust systems, to which the disclosure is applied.

Initially, a first embodiment of the disclosure will be described with reference to FIG. 1 to FIG. 10. FIG. 1 is a view that shows the schematic configuration of an internal combustion engine and its intake and exhaust systems, to which the disclosure is applied. The internal combustion engine 1 shown in FIG. 1 is a compression-ignition internal combustion engine (diesel engine) that uses light oil as fuel. The internal combustion engine 1 includes a fuel injection valve 3 that injects fuel into a cylinder 2.

The internal combustion engine 1 is connected to an intake passage 4. An air flow meter 40 and a throttle valve 41 are provided in the intake passage 4. The air flow meter 40 outputs an electrical signal corresponding to the amount (mass) of intake air (air) flowing through the intake passage 4. The throttle valve 41 is arranged in the intake passage 4 at a portion downstream of the air flow meter 40. The throttle valve 41 adjusts the intake air amount of the internal combustion engine 1 by changing the passage sectional area of the intake passage 4.

The internal combustion engine 1 is connected to an exhaust passage 5. A filter casing 50 is arranged in the exhaust passage 5. The filter casing 50 accommodates a particulate filter 50a (hereinafter, simply referred to as filter 50a) that collects particulate matter in exhaust gas. The filter 50a is a wall-flow particulate filter. An oxidation catalyst is supported on the base material of the filter 50a. A fuel addition valve 51 is provided in the exhaust passage 5 at a portion upstream of the filter casing 50. The fuel addition valve 51 adds unburned fuel into exhaust gas.

An exhaust gas temperature sensor 52 is arranged in the exhaust passage 5 at a portion downstream of the filter casing 50. The exhaust gas temperature sensor 52 outputs an electrical signal that correlates with the temperature of exhaust gas flowing out from the filter casing 50. A differential pressure sensor 53 is attached to the exhaust passage 5. The differential pressure sensor 53 outputs an electrical signal corresponding to the difference between an exhaust gas pressure upstream of the filter 50a and an exhaust gas pressure downstream of the filter 50a (hereinafter, referred to as upstream-downstream differential pressure).

An electronic control unit 10 is provided together with the thus configured internal combustion engine 1. The electronic control unit 10 is an electronic control unit including a CPU, a ROM, a RAM, a backup RAM, and the like. The electronic control unit 10 is electrically connected to various sensors, such as an accelerator position sensor 7 and a crank position sensor 8, in addition to the above-described air flow meter 40, exhaust gas temperature sensor 52 and differential pressure sensor 53. The accelerator position sensor 7 is a sensor that outputs an electrical signal that correlates with the operation amount of an accelerator pedal (not shown) (accelerator operation amount). The crank position sensor 8 is a sensor that outputs an electrical signal that correlates with the rotation position of an engine output shaft (crankshaft) of the internal combustion engine 1. The output signals of these various sensors are input to the electronic control unit 10.

The electronic control unit 10 is electrically connected to various devices, such as the fuel injection valve 3, the throttle valve 41 and the fuel addition valve 51. The electronic control unit 10 controls the above-described various devices on the basis of the output signals of the above-described various sensors. For example, the electronic control unit 10 computes a target air-fuel ratio of air-fuel mixture on the basis of the output signals of the accelerator position sensor 7 and crank position sensor 8, and computes a target fuel injection amount per one cylinder (fuel injection time) from the target air-fuel ratio and the output signal of the air flow meter 40. The electronic control unit 10 controls the fuel injection valve 3 in accordance with the target fuel injection amount. The electronic control unit 10 executes a filter regeneration process for oxidizing and removing particulate matter accumulated in the filter 50a in order to reduce clogging of the filter 50a due to accumulation of particulate matter in the filter 50a during an operation period of the internal combustion engine 1 as needed. Hereinafter, a method of executing the filter regeneration process in the present embodiment will be described.

When the amount (particulate matter accumulation amount) $\Sigma PM$ of particulate matter accumulated in the filter 50a exceeds a predetermined value, the back pressure due to the pressure loss in the filter 50a becomes excessively high, leading to inconveniences, such as a decrease in the output of the internal combustion engine 1 and deterioration of fuel consumption rate. For this reason, the electronic control unit 10 estimates a particulate matter accumulation amount $\Sigma PM$ in the filter 50a at predetermined intervals during the operation period of the internal combustion engine 1, and executes the filter regeneration process at the time when the particulate matter accumulation amount $\Sigma PM$ has reached a predetermined threshold $\Sigma PMthr$. The particulate matter accumulation amount $\Sigma PM$ in the filter 50a is estimated by a method of integrating the difference between the amount of particulate matter that is collected by the filter 50a per unit time and the amount of particulate matter that is oxidized in the filter 50a per unit time. At this time, the amount of particulate matter that is collected by the filter 50a per unit time is obtained by multiplying the amount of particulate matter that is emitted from the internal combustion engine 1 per unit time by a collection rate that is determined depending on the specifications of the filter 50a. The amount of particulate matter that is emitted from the internal combustion engine 1 per unit time is estimated from the operation state of the internal combustion engine 1. On the other hand, the amount of particulate matter that is oxidized in the filter 50a per unit time is computed by using the temperature of the filter 50a, the last value of the particulate matter accumulation amount $\Sigma PM$, the concentration of oxygen in exhaust gas flowing into the filter 50a, and the concentration of $NO_2$ in exhaust gas flowing into the filter 50a as parameters. The temperature of the filter 50a is estimated on the basis of a detected value of the exhaust gas temperature sensor 52. The concentration of oxygen in exhaust gas flowing into the filter 50a may be estimated from the operation state of the internal combustion engine 1 or may be detected by an oxygen concentration sensor. The concentration of $NO_2$ in exhaust gas flowing into the filter 50a may be estimated from the operation state of the internal combustion engine 1 or may be estimated from a detected value of a NOx sensor. The particulate matter accumulation amount $\Sigma PM$ in the filter 50a may be computed by using an upstream-downstream differential pressure that is detected by the differential pressure sensor 53 and an exhaust flow rate (the total of a fuel injection amount and an intake air amount) as parameters. The electronic control unit 10 obtains the particulate matter accumulation amount $\Sigma PM$ with such a method. Thus, acquisition means according to the disclosure is implemented.

The following method may be used as an example method of executing the filter regeneration process. The electronic control unit 10 adds fuel from the fuel addition valve 51 to exhaust gas. The added fuel is oxidized with an oxidation catalyst that is supported on the filter 50*a*. The temperature of the filter 50*a* is raised to a particulate matter oxidizable temperature (first target temperature) with the heat of reaction that occurs at that time. In the internal combustion engine 1 including no fuel addition valve 51, the electronic control unit 10 may cause the fuel injection valve 3 of the cylinder 2 in exhaust stroke to inject (post injection) to thereby supply unburned fuel to the filter 50*a*. When a heater that electrically heats the filter 50*a* is provided together with the internal combustion engine 1, the electronic control unit 10 may raise the temperature of the filter 50*a* to the first target temperature with the heater. The above-described fuel addition valve 51, fuel injection valve 3 and heater are examples of a temperature raising device that raises the temperature of the filter. The first target temperature is set to a temperature at which particulate matter that is emitted from the internal combustion engine 1 is efficiently oxidized and removed and at which the temperature of the filter 50*a* does not excessively rise during execution of the filter regeneration process.

Incidentally, the amount of particulate matter that is oxidized per unit time (particulate matter oxidation rate) in the filter 50*a* during execution of the filter regeneration process depends on how much particulate matter accumulated in the filter 50*a* is easily oxidizable. That is, as the amount of accumulated easily-oxidizable particulate matter within the total amount of particulate matter accumulated in the filter 50*a* increases, the amount of particulate matter that is oxidized per unit time increases during execution of the filter regeneration process. However, it has been presumed that there is a difference in easiness of oxidation between soluble organic fraction and soot that constitute particulate matter and easiness of oxidation of soot is uniform. For this reason, there has been proposed a method of adjusting the execution time of the filter regeneration process on the basis of the proportion of the amount of accumulated soluble organic fraction to the total amount of particulate matter accumulated in the filter 50*a*. However, it has not been proposed yet a method of adjusting the execution time of the filter regeneration process in consideration of the fact that there is a difference in easiness of oxidation within soot.

Figure 2:
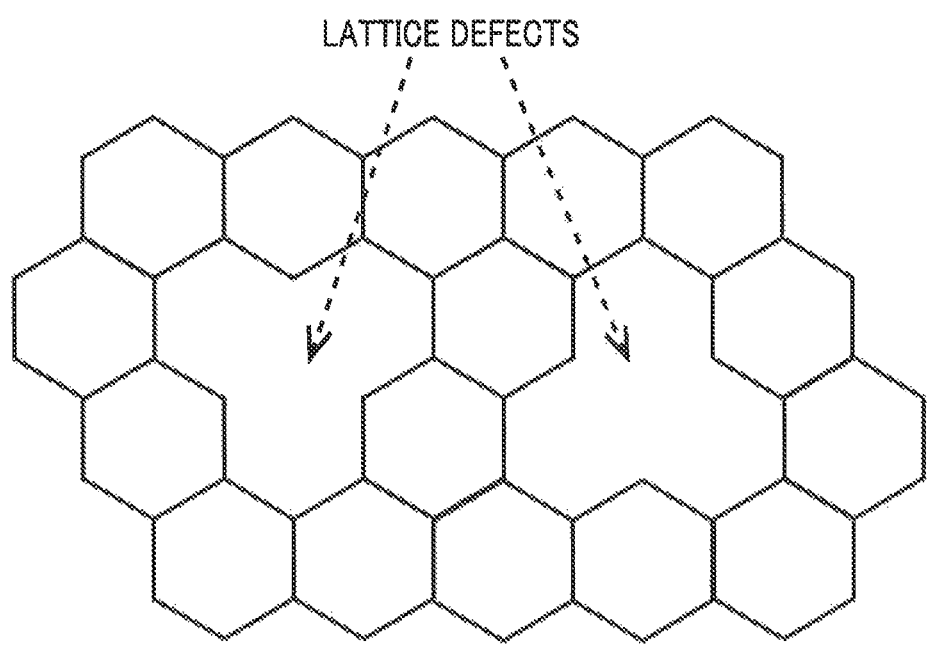
FIG. 2 is a view for illustrating the concept of lattice defects of defective soot.
Figure 3A:
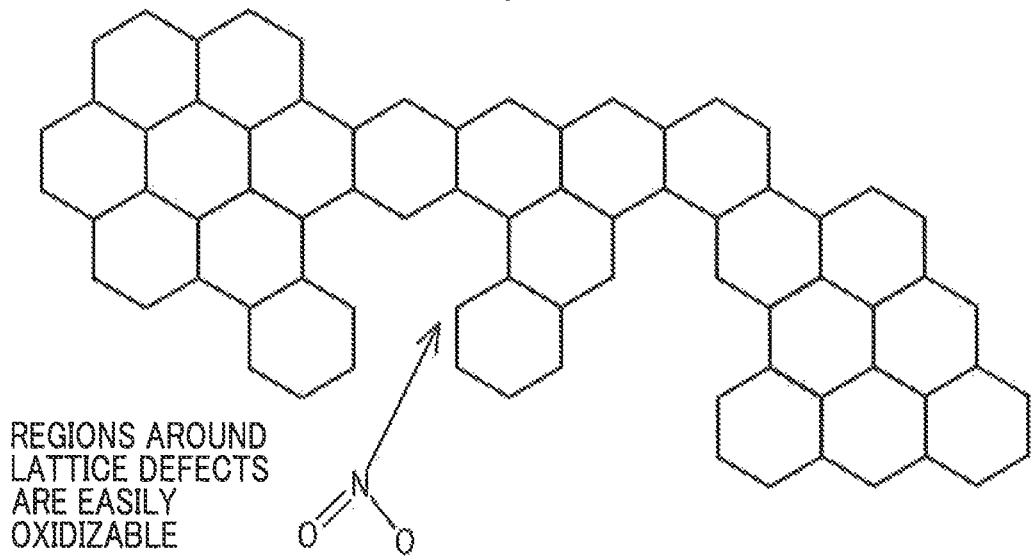
FIG. 3A is a view for illustrating a concept that defective soot is oxidized.
Figure 3B:
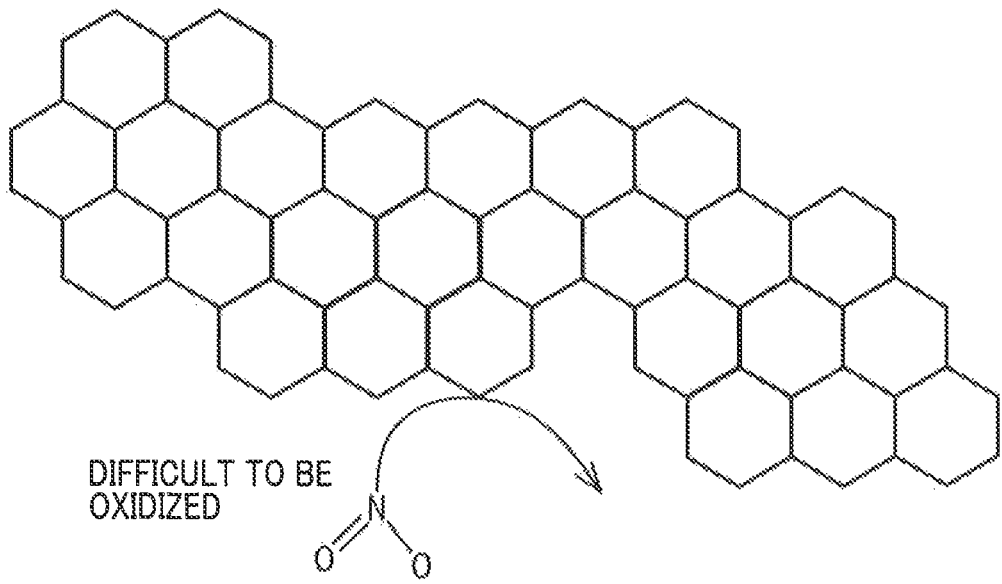
FIG. 3B is a view for illustrating a concept that defective soot is oxidized.
Figure 4:
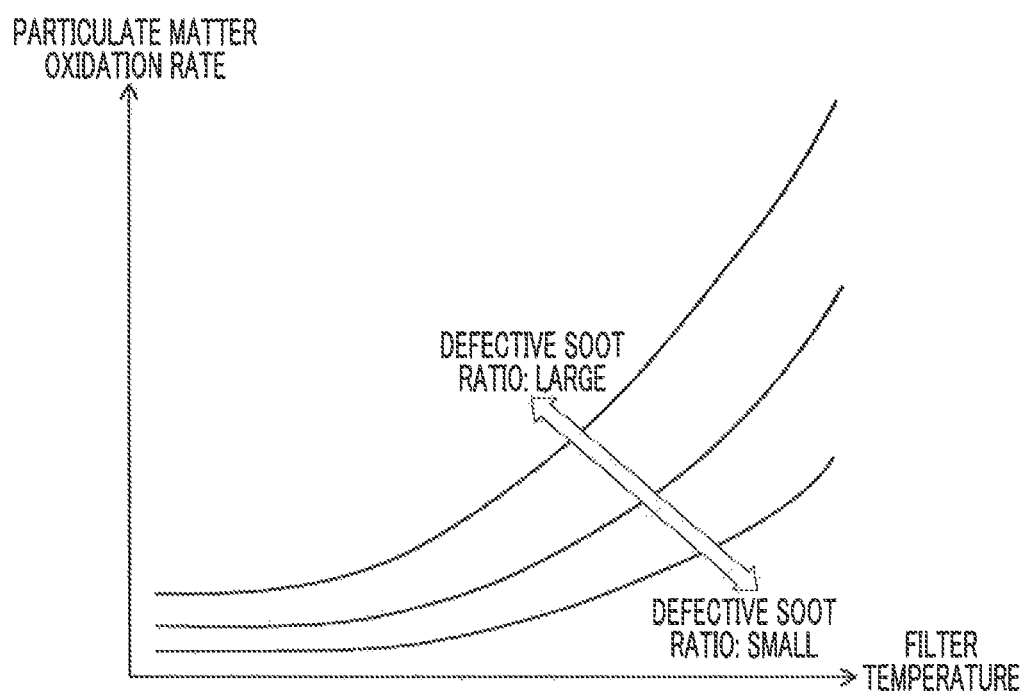
FIG. 4 is a graph for illustrating the influence of an accumulated defective soot ratio on a particulate matter oxidation rate as for the correlation between a filter temperature and a particulate matter oxidation rate.

As for the oxidation property of soot, the inventors of the present application found that easiness of oxidation of soot that is emitted from the internal combustion engine 1 is not uniform but easiness of oxidation varies depending on the crystal structure. That is, the inventors of the present application found that soot having an easily-oxidizable crystal structure is contained in soot that is emitted from the internal combustion engine 1. Soot having an easily-oxidizable crystal structure is presumably soot having a large number of lattice defects (defective soot). FIG. 2 is a view that shows the concept of lattice defects in the disclosure. As shown in FIG. 2, in a crystal lattice composed of carbon atoms, a region in which a grating density is low because of irregularities of atomic arrangement is a lattice defect in the disclosure. Defective soot in the disclosure is soot having a large number of the above-described lattice defects, and is soot of which the peak value of a D-band derived from defects is larger than or equal to a predetermined value in a spectrum that is obtained through Raman scattering spectroscopy. FIG. 3A and FIG. 3B show concepts that the above-described defective soot is oxidized. As shown in FIG. 3A, since portions of defective soot around lattice defects tend to be oxidized by an oxide (for example, $NO_2$), it is presumed that soot is easily oxidized as a whole. The amount of particulate matter that is oxidized per unit time during execution of the filter regeneration process in the case where the proportion (defective soot ratio) of the amount of accumulated defective soot to the total amount of particulate matter accumulated in the filter 50*a* (particulate matter accumulation amount ΣPM) is large, is larger than the amount of particulate matter that is oxidized per unit time during execution of the filter regeneration process in the case where the proportion of the amount of accumulated defective soot to the total amount of particulate matter accumulated in the filter 50*a* is small. That is, a particulate matter oxidation rate during execution of the filter regeneration process in the case where the defective soot ratio is large is higher than the particulate matter oxidation rate during execution of the filter regeneration process in the case where the defective soot ratio is small. FIG. 4 is a graph for illustrating the influence of an accumulated defective soot ratio on the particulate matter oxidation rate as for the correlation between a filter temperature and a particulate matter oxidation rate. In FIG. 4, the oxidation rate of particulate matter accumulated in the filter 50*a* increases as the temperature of the filter 50*a* rises. In addition, the oxidation rate of particulate matter accumulated in the filter 50*a* in the case where the defective soot ratio is large is higher than the oxidation rate of particulate matter accumulated in the filter 50*a* in the case where the defective soot ratio is small. If the execution time of the filter regeneration process is set without consideration of these characteristics, the execution time of the filter regeneration process becomes excessively long or excessively short as described above. This can lead to deterioration of fuel consumption rate, thermal degradation of the filter 50*a*, a decrease in engine output, or the like. As a result, it may not be able to efficiently oxidize and remove particulate matter accumulated in the filter 50*a*.

Figure 5:
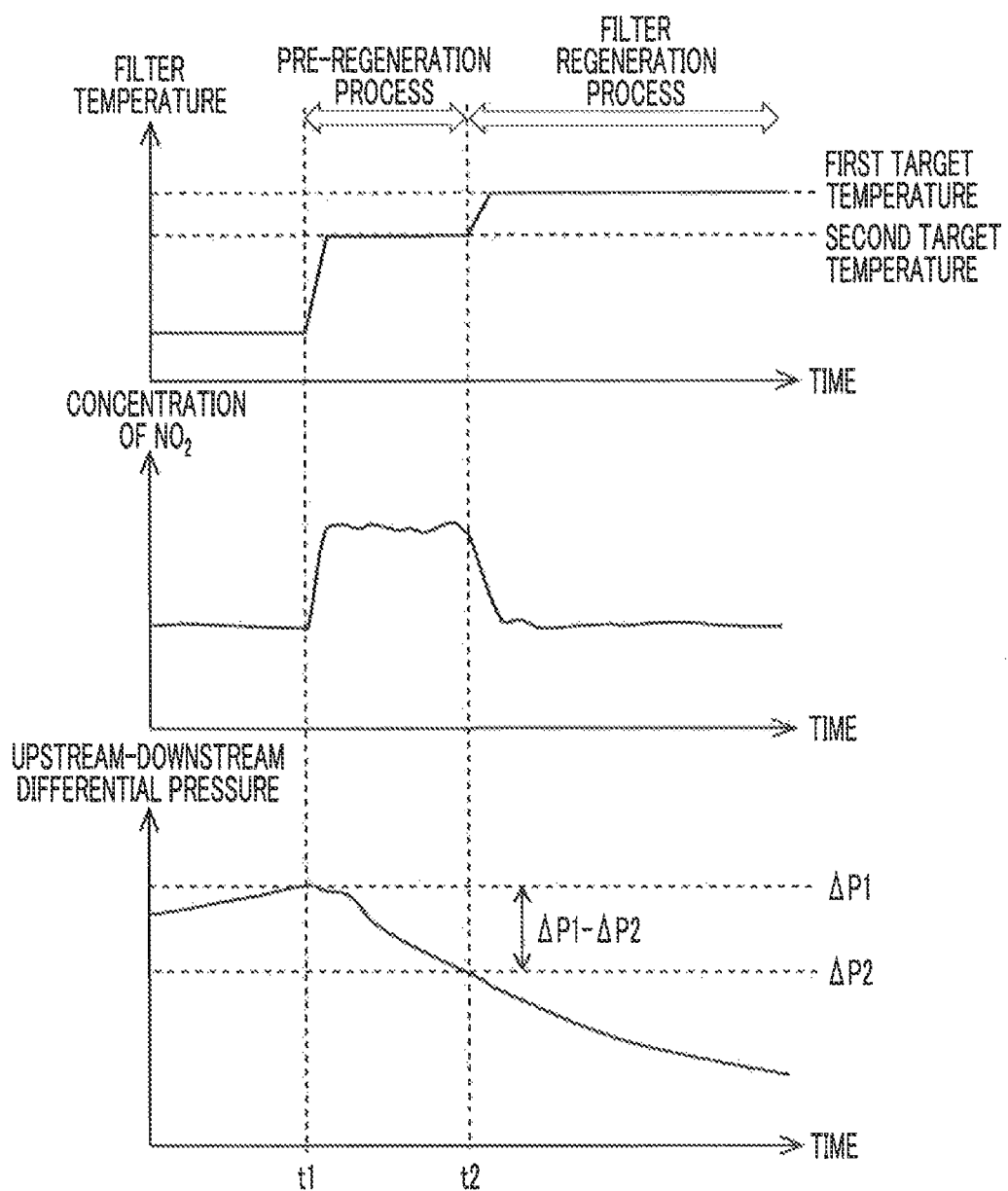
FIG. 5 is a timing chart that shows the flow of a series of a pre-regeneration process and a filter regeneration process.

In the filter regeneration process according to the present embodiment, the execution time of the filter regeneration process is adjusted in consideration of the defective soot ratio of soot accumulated in the filter 50*a*. Specifically, a pre-regeneration process is executed for a predetermined period before execution of the filter regeneration process, and the execution time of the filter regeneration process is adjusted on the basis of the speed of change in the upstream-downstream differential pressure during execution of the pre-regeneration process. FIG. 5 is a timing chart that shows changes with time in the temperature of the filter 50*a* (filter temperature), the concentration of $NO_2$ in exhaust gas flowing into the filter 50*a*, and the upstream-downstream differential pressure in the case where the pre-regeneration process and the filter regeneration process are executed. In FIG. 5, t1 indicates time at which the particulate matter accumulation amount ΣPM in the filter 50*a* has reached the predetermined threshold ΣPMthr. As shown in FIG. 5, the electronic control unit 10 initially executes the pre-regeneration process for a predetermined period (a period of t1 to t2 in FIG. 5) at the time when the particulate matter accumulation amount ΣPM has reached the predetermined threshold ΣPMthr (t1 in FIG. 5), and starts the filter regeneration process at the time when the pre-regeneration process has ended. The pre-regeneration process is a process of raising the temperature of the filter 50*a* to a second target temperature higher than or equal to a temperature at which defective soot oxidizes and lower than a temperature at which soot having a small number of lattice defects oxidizes (first target temperature), and increasing the concentration of $NO_2$ contained in exhaust gas flowing into the filter 50*a* as compared to the concentration of $NO_2$ before execution of the pre-regeneration process. Under the existence of $NO_2$, defective soot is oxidized at a further lower temperature as compared to soot having a small number of lattice defects. For this reason, the second target temperature is set to a temperature (for example, about 400° C.) at which defective soot is oxidized and soot having a smaller number of lattice defects is not oxidized under the existence of $NO_2$. The predetermined period is a period sufficiently shorter than a period required to execute the filter regeneration process, and is a short period to such an extent that slightest part of defective soot accumulated in the filter is oxidized. When the pre-regeneration process is executed with such a method, the amount of particulate matter that is oxidized per unit time during execution of the pre-regeneration process in the case where the defective soot ratio is large is larger than the amount of particulate matter that is oxidized per unit time during execution of the pre-regeneration process in the case where the defective soot ratio is small. Accordingly, the speed of change (the speed of deceleration) in the detected value (upstream-downstream differential pressure) of the differential pressure sensor 53 during execution of the pre-regeneration process increases. That is, it may be regarded that the defective soot ratio in the case where the speed of change in upstream-downstream differential pressure during execution of the pre-regeneration process is large is higher than the defective soot ratio in the case where the speed of change in upstream-downstream differential pressure during execution of the pre-regeneration process is small. Thus, the execution time of the filter regeneration process in the case where the speed of change in upstream-downstream differential pressure during execution of the pre-regeneration process is large is made shorter than the execution time of the filter regeneration process in the case where the speed of change in upstream-downstream differential pressure during execution of the pre-regeneration process is small. Thus, it is possible to suppress an excessively long execution time of the filter regeneration process or an excessively short execution time of the filter regeneration process.

Figure 6:
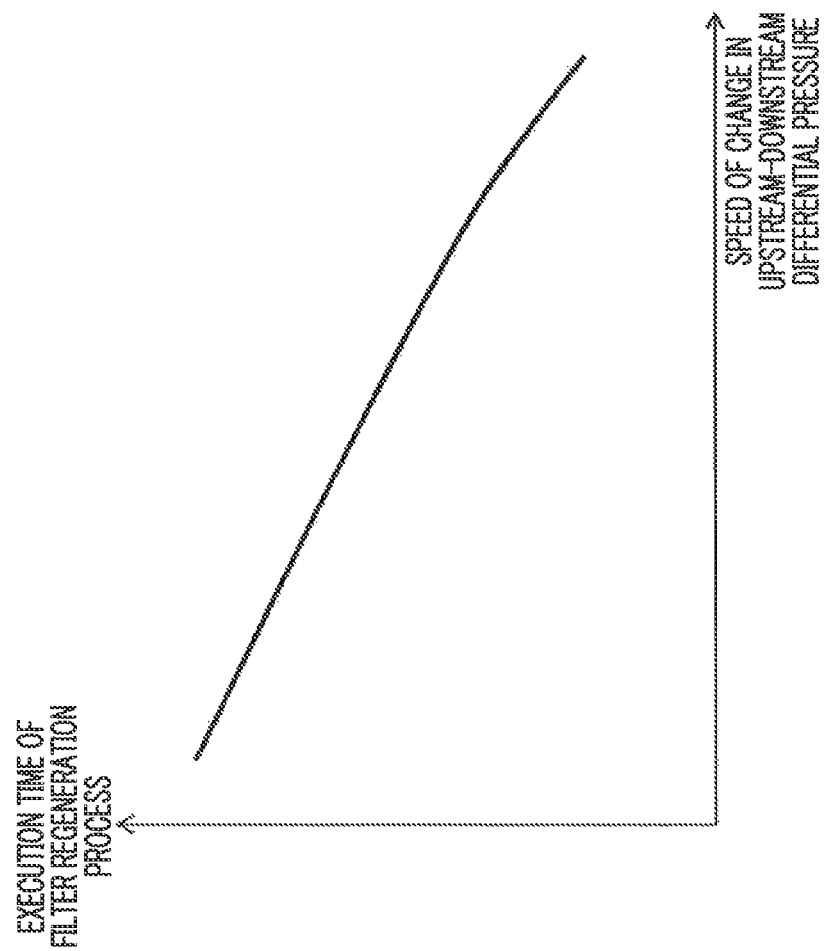
FIG. 6 is a graph that shows the relationship between a speed of change in a detected value (upstream-downstream differential pressure) of a differential pressure sensor during execution of the pre-regeneration process and an execution time of the filter regeneration process.

The speed of change in upstream-downstream differential pressure during execution of the pre-regeneration process is allowed to be obtained by dividing the difference ($\Delta P1-\Delta P2$) between a detected value (upstream-downstream differential pressure) $\Delta P1$ of the differential pressure sensor 53 at the time when the pre-regeneration process is started (t1 in FIG. 5) and a detected value (upstream-downstream differential pressure) $\Delta P2$ of the differential pressure sensor 53 at the time when the pre-regeneration process is ended (t2 in FIG. 5) by the execution time (t2−t1) of the pre-regeneration process. The relationship between a speed of change in upstream-downstream differential pressure during execution of the pre-regeneration process and an execution time of the filter regeneration process is obtained through adaptation process that utilizes an experiment, or the like, in advance, and the relationship is stored in the ROM of the electronic control unit 10 in form of a map or function expression. At this time, the relationship between a speed of change in upstream-downstream differential pressure during execution of the pre-regeneration process and an execution time of the filter regeneration process is set such that, as shown in FIG. 6, the execution time of the filter regeneration process in the case where the speed of change in upstream-downstream differential pressure during execution of the pre-regeneration process is large is shorter than the execution time of the filter regeneration process in the case where the speed of change in upstream-downstream differential pressure during execution of the pre-regeneration process is small. In FIG. 6, the relationship between a speed of change in upstream-downstream differential pressure during execution of the pre-regeneration process and an execution time of the filter regeneration process is substantially a linear relationship; however, it can be a nonlinear relationship depending on the specifications of the internal combustion engine or filter.

Figure 7:
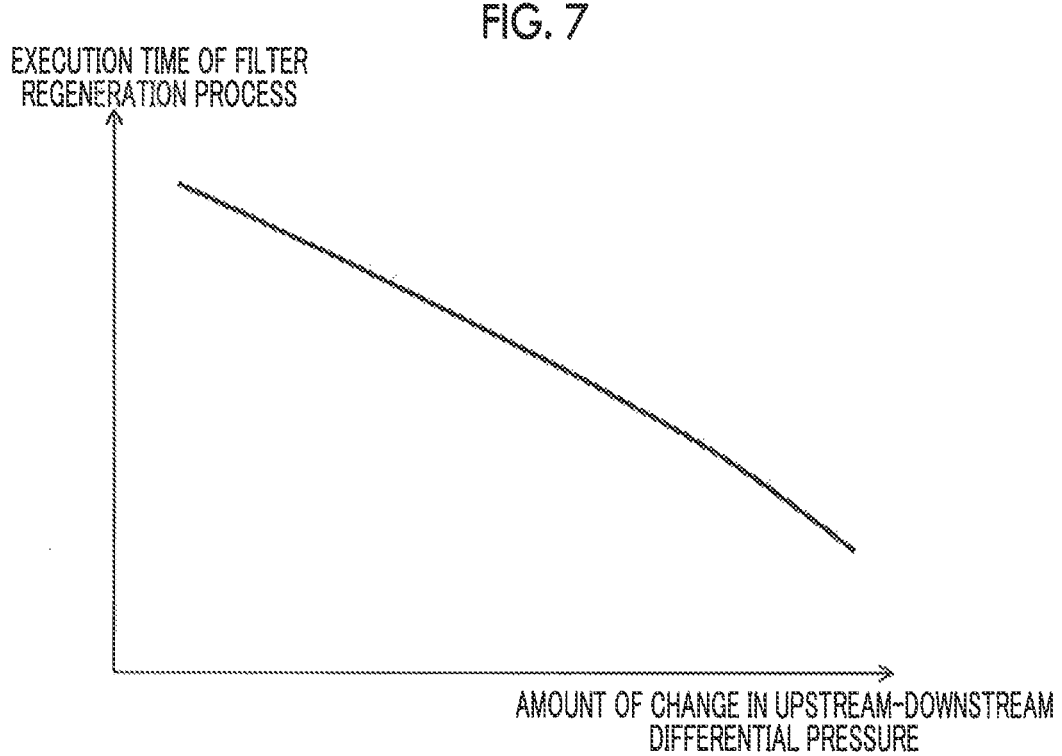
FIG. 7 is a graph that shows the relationship between an amount of change in a detected value (upstream-downstream differential pressure) of the differential pressure sensor and an execution time of the filter regeneration process in the case where the pre-regeneration process is executed for a predetermined time.

The predetermined period may be a predetermined time set in advance. The predetermined time is a time sufficiently shorter than a time required to execute the filter regeneration process, and is a short time to such an extent that slightest part of defective soot accumulated in the filter is oxidized. In this case, the electronic control unit 10 may set the execution time of the filter regeneration process by using an amount of change in the detected value (upstream-downstream differential pressure) of the differential pressure sensor 53 during execution of the pre-regeneration process. Specifically, as shown in FIG. 7, the execution time of the filter regeneration process in the case where an amount of change in the detected value (an amount of change in upstream-downstream differential pressure) of the differential pressure sensor 53 in the predetermined period is large should be made shorter than the execution time of the filter regeneration process in the case where the amount of change is small. When the predetermined period is set in this way, it is possible to reduce the execution time of the pre-regeneration process to a short time as much as possible. In FIG. 7, the relationship between an amount of change in upstream-downstream differential pressure during execution of the pre-regeneration process and an execution time of the filter regeneration process is substantially a linear relationship; however, it can be a nonlinear relationship depending on the specifications of the internal combustion engine or filter.

Figure 8:
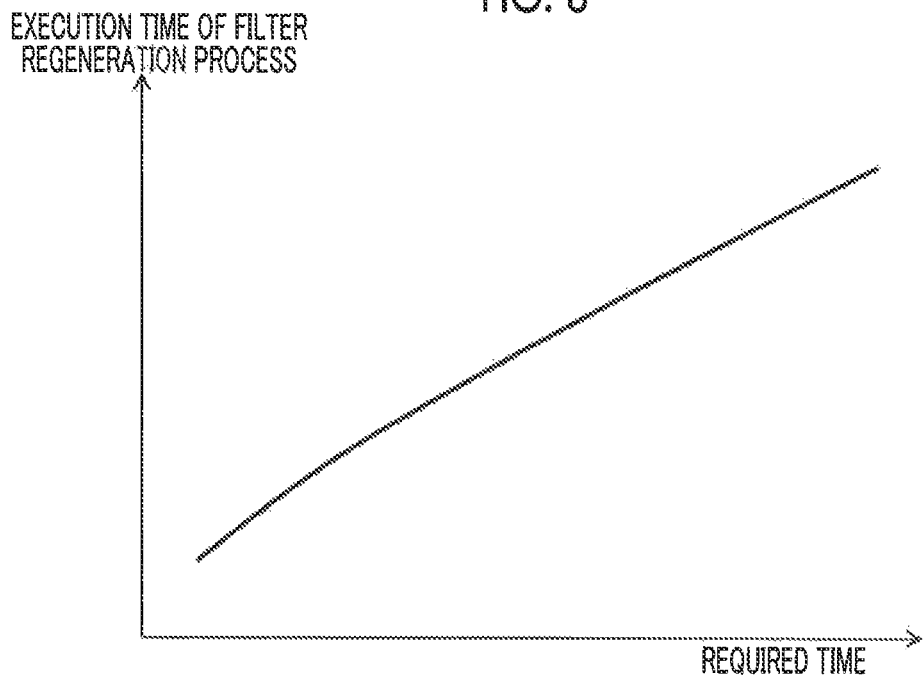
FIG. 8 is a graph that shows the relationship between a time (required time) required to execute the pre-regeneration process and an execution time of the filter regeneration process in the case where the pre-regeneration process is executed until an amount of change in the detected value of the differential pressure sensor reaches a set amount.

The predetermined period may be a period until an amount of change in the detected value (upstream-downstream differential pressure) of the differential pressure sensor 53 from the start of the pre-regeneration process reaches a set amount. The set amount is a value larger than variations in the amount of change in upstream-downstream differential pressure due to unevenness of the differential pressure sensor, or the like. In this case, the electronic control unit 10 may set the execution time of the filter regeneration process by using the length of the predetermined period as a parameter. Specifically, as shown in FIG. 8, the execution time of the filter regeneration process in the case where a time (required time) required until the amount of change in the detected value (upstream-downstream differential pressure) of the differential pressure sensor 53 from the start of the pre-regeneration process reaches the set amount is short should be made shorter than the execution time of the filter regeneration process in the case where the required time is long. When the predetermined period is set in this way, it is possible to further accurately detect a physical quantity that correlates with the speed of change in the upstream-downstream differential pressure during execution of the pre-regeneration process. In FIG. 8, the relationship between an execution time (required time) of the pre-regeneration process and an execution time of the filter regeneration process is substantially a linear relationship; however, it can be a nonlinear shape depending on the specifications of the internal combustion engine or filter.

Figure 9:
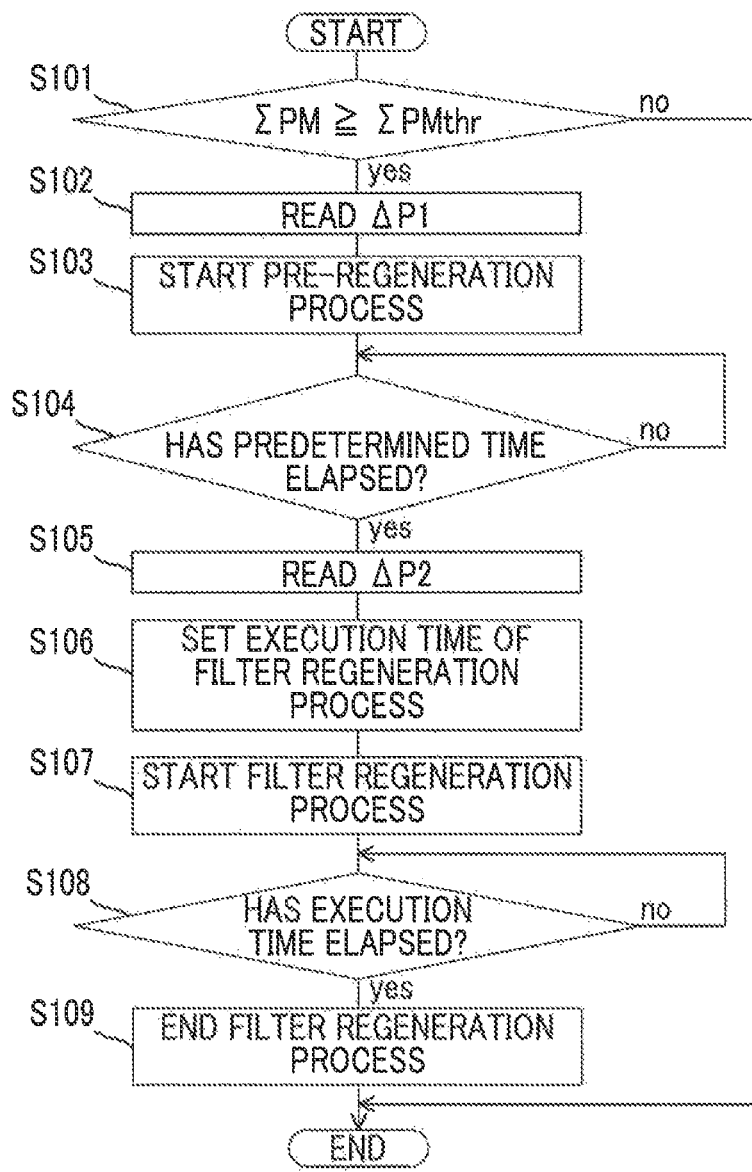
FIG. 9 is a flowchart that shows a process routine that is executed by an electronic control unit in the case where particulate matter accumulated in a filter is oxidized and removed in a first embodiment.

Hereinafter, the procedure of oxidizing and removing particulate matter accumulated in the filter 50a in the present embodiment will be described with reference to FIG. 9. FIG. 9 is a flowchart that shows a process routine that is executed by the electronic control unit 10 at the time when particulate matter accumulated in the filter 50a is oxidized and removed. This process routine is stored in the ROM of the electronic control unit 10 in advance, and is repeatedly executed by the electronic control unit 10.

In the process routine of FIG. 9, the electronic control unit 10 initially in the process of S101 determines whether the particulate matter accumulation amount ΣPM in the filter 50a is larger than or equal to the predetermined threshold ΣPMthr. At this time, the particulate matter accumulation amount ΣPM may be estimated from the operation state of the internal combustion engine 1 or may be estimated from the detected value (upstream-downstream differential pressure) of the differential pressure sensor 53 as described above. When negative determination is made in the process of S101, the electronic control unit 10 ends execution of the process routine without executing the pre-regeneration process or the filter regeneration process. On the other hand, when affirmative determination is made in the process of S101, the electronic control unit 10 proceeds to the process of S102.

In the process of S102, the electronic control unit 10 reads the detected value (upstream-downstream differential pressure) ΔP1 of the differential pressure sensor 53. Subsequently, the electronic control unit 10 proceeds to the process of S103, and starts the pre-regeneration process. Specifically, the electronic control unit 10 raises the temperature of the filter 50a to the second target temperature, and increases the concentration of $NO_2$ contained in exhaust gas flowing into the filter 50a as compared to the concentration of $NO_2$ before execution of the pre-regeneration process. A method of adding fuel from the fuel addition valve 51 to exhaust gas or a method of performing post-injection from the fuel injection valve 3 is used as a method of raising the temperature of the filter 50a, as in the case of the above-described filter regeneration process. A method of controlling the internal combustion engine by the electronic control unit 10 and advancing the fuel injection timing of the fuel injection valve 3 to timing before a top dead center (TDC) in a compression stroke may be used as a method of increasing the concentration of $NO_2$ in exhaust gas flowing into the filter 50a. When an EGR device for recirculating part of exhaust gas flowing through the exhaust passage 5 to the intake passage 4 as EGR gas is provided together with the internal combustion engine 1, the concentration of $NO_2$ in exhaust gas flowing into the filter 50a may be increased by controlling the internal combustion engine by the electronic control unit 10 to reduce the amount of EGR gas that is recirculated by the EGR device as compared to the amount of EGR gas that is recirculated by the EGR device before execution of the pre-regeneration process.

In the process of S104, the electronic control unit 10 determines whether an elapsed time from the start of the pre-regeneration process is longer than or equal to a predetermined time. When negative determination is made in the process of S104, the electronic control unit 10 continues execution of the pre-regeneration process by executing the process of S104 again. On the other hand, when affirmative determination is made in the process of S104, the electronic control unit 10 proceeds to the process of S105, and reads the detected value (upstream-downstream differential pressure) ΔP2 of the differential pressure sensor 53.

In the process of S106, the electronic control unit 10 sets the execution time of the filter regeneration process that is executed after the completion of the pre-regeneration process. More specifically, the speed of change in upstream-downstream differential pressure is computed by dividing the difference (ΔP1−ΔP2) between the upstream-downstream differential pressure ΔP1 read in the process of S102 and the upstream-downstream differential pressure ΔP2 read in the process of S105 by the predetermined time. The upstream-downstream differential pressure ΔP1 read in the process of S102 corresponds to the upstream-downstream differential pressure of the filter 50a at the start of the pre-regeneration process. The upstream-downstream differential pressure ΔP2 read in the process of S105 corresponds to the upstream-downstream differential pressure of the filter 50a at the completion of the pre-regeneration process. Subsequently, the electronic control unit 10 derives the execution time of the filter regeneration process, corresponding to the speed of change in upstream-downstream differential pressure, by accessing the above-described map of FIG. 6 using the speed of change in upstream-downstream differential pressure, obtained in the above-described procedure, as an argument. As described with reference to FIG. 7, the execution time of the filter regeneration process may be set by using the amount of change (ΔP1−ΔP2) in upstream-downstream differential pressure ΔP over the predetermined time as a parameter.

In the process of S107, the electronic control unit 10 ends the pre-regeneration process, and starts the filter regeneration process. At this time, the temperature of the filter 50a is raised from the second target temperature to the first target temperature.

In the process of S108, the electronic control unit 10 determines whether an elapsed time from the start of the filter regeneration process has reached the predetermined execution time set in S106. When negative determination is made in the process of S108, the electronic control unit 10 continues execution of the filter regeneration process by executing the process of S108 again. On the other hand, when affirmative determination is made in the process of S108, the electronic control unit 10 proceeds to the process of S109, and ends the filter regeneration process.

When the electronic control unit 10 executes the process routine of FIG. 9 in this way, regeneration means according to the disclosure is implemented. For this reason, the execution time of the filter regeneration process is allowed to be set to the length based on the defective soot ratio of particulate matter accumulated in the filter 50a. As a result, it is possible to efficiently oxidize and remove particulate matter accumulated in the filter 50a.

Figure 10:
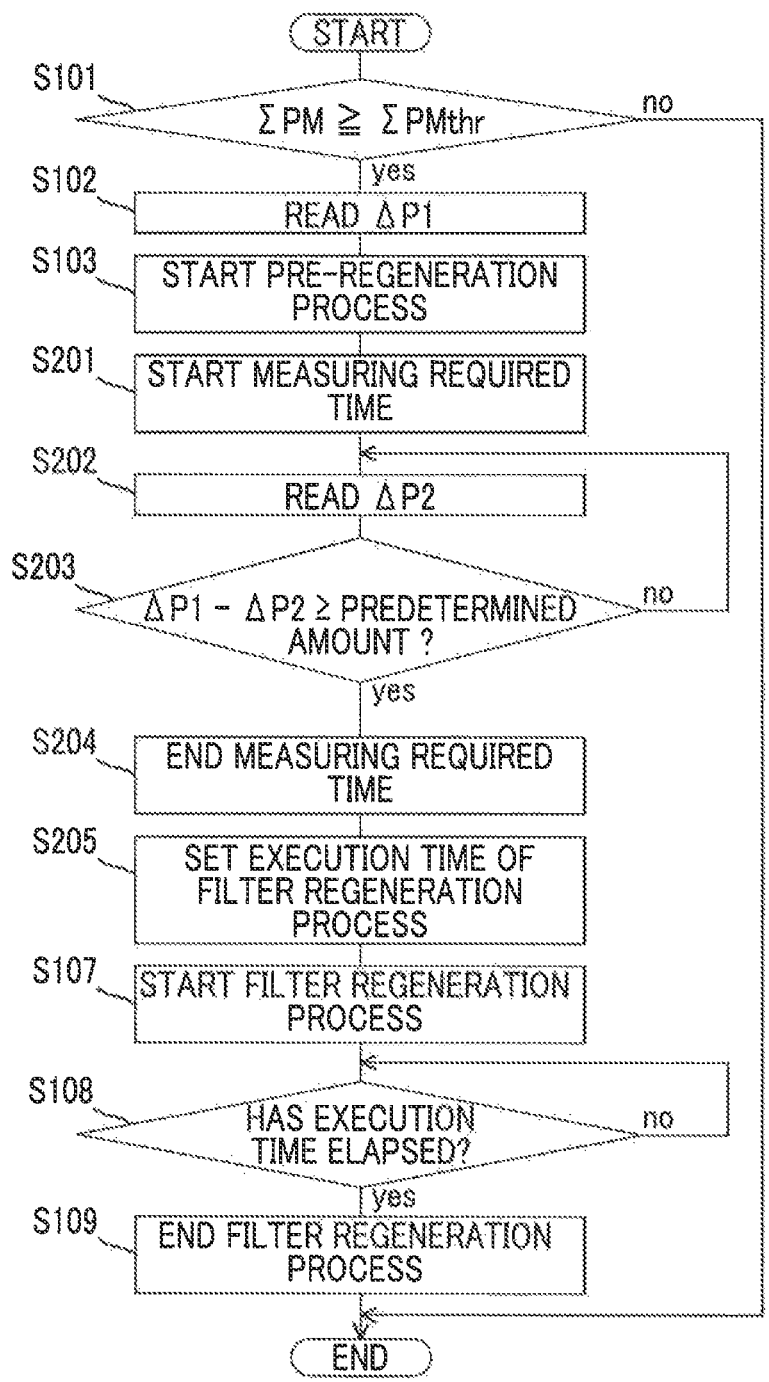
FIG. 10 is a flowchart that shows a process routine that is executed by an electronic control unit in the case where particulate matter accumulated in a filter is oxidized and removed according to an alternative embodiment to the first embodiment.

The process routine of FIG. 9 is a process routine in the case where the pre-regeneration process is executed for the predetermined time; however, the pre-regeneration process may be executed until the amount of change in upstream-downstream differential pressure ΔP reaches the set amount. In this case, as shown in FIG. 10, instead of the processes of S104 to S106 in FIG. 9, the processes of S201 to S205 may be executed. More specifically, the electronic control unit 10 starts measuring an elapsed time (required time) from the start of the pre-regeneration process in the process of S201. Subsequently, in the process of S202, the electronic control unit 10 reads the detected value (upstream-downstream differential pressure) ΔP2 of the differential pressure sensor 53. In the process of S203, the electronic control unit 10 determines whether the difference (ΔP1−ΔP2) between the upstream-downstream differential pressure ΔP1 read in the process of S102 and the upstream-downstream differential pressure ΔP2 read in the process of S202 is larger than or equal to a set amount. When negative determination is made in the process of S203, the electronic control unit 10 returns to the process of S202, and continues execution of the pre-regeneration process. On the other hand, when affirmative determination is made in the process of S203, the electronic control unit 10 proceeds to the process of S204, and ends measuring the execution time (required time) of the pre-regeneration process. The electronic control unit 10 proceeds to the process of S205, and derives the execution time of the filter regeneration process by accessing the above-described map of FIG. 8 using the required time as an argument. With such a method, when the set amount is set to a value larger than variations in the amount of change in upstream-downstream differential pressure ΔP due to unevenness of the differential pressure sensor 53, or the like, it is possible to further accurately detect the amount of change in actual upstream-downstream differential pressure during execution of the pre-regeneration process. The electronic control unit 10 may compute the speed of change in upstream-downstream differential pressure by dividing the set amount (the amount of change (ΔP1−ΔP2) in upstream-downstream differential pressure ΔP) by the required time, and may set the execution time of the filter regeneration process on the basis of the speed of change and the above-described map of FIG. 6.

Incidentally, the speed of change in upstream-downstream differential pressure ΔP during execution of the pre-regeneration process can vary with the flow rate of exhaust gas even when the defective soot ratio of particulate matter accumulated in the filter 50a remains unchanged. For this reason, the pre-regeneration process may be executed in a steady operation state, such as an idle operation state.

Next, a second embodiment of the disclosure will be described with reference to FIG. 11 and FIG. 12. Components different from those of the above-described first embodiment will be described here, and the description of similar components is omitted.

The above-described first embodiment differs from the present embodiment in that the relationship between a temperature of the filter 50a (hereinafter, simply referred to as filter temperature) and a particulate matter oxidation rate, which corresponds to the speed of change in upstream-downstream differential pressure ΔP during execution of the pre-regeneration process, is obtained and the execution time of the filter regeneration process is adjusted on the basis of the particulate matter oxidation rate at the time when the temperature of the filter 50a is equal to the first target temperature in this relationship.

Specifically, the electronic control unit 10 initially converts the speed of change in upstream-downstream differential pressure ΔP to the oxidation rate of defective soot on the basis of the correlation between an upstream-downstream differential pressure ΔP and a particulate matter accumulation amount ΣPM. Subsequently, the electronic control unit 10 computes the amount of accumulated defective soot on the basis of the following mathematical expression (1).

[Defective soot accumulation amount]=[Defective soot oxidation rate]/([Concentration of NO$_2$]* [Concentration of O$_2$]*k)     (1)

In the above mathematical expression (1), the concentration of NO$_2$ is the concentration of NO$_2$ in exhaust gas flowing into the filter 50a during execution of the pre-regeneration process. The concentration of O$_2$ is the concentration of O$_2$ in exhaust gas flowing into the filter 50a during execution of the pre-regeneration process. k denotes a coefficient that is set on the basis of the temperature of exhaust gas.

Subsequently, the electronic control unit 10 computes a defective soot ratio by dividing the defective soot accumulation amount calculated on the basis of the above-described mathematical expression (1) by the total amount of particulate matter (particulate matter accumulation amount ΣPM) accumulated in the filter 50a. The electronic control unit 10 sets the relationship between a filter temperature and a particulate matter oxidation rate on the assumption that particulate matter of the defective soot ratio computed in this way is accumulated in the filter 50a. Specifically, the relationship between a filter temperature and a particulate matter oxidation rate, which corresponds to the defective soot ratio computed as described above, should be extracted from the relationship described in the graph of FIG. 4. At this time, the above-described relationship shown in FIG. 4 is empirically obtained in advance.

Figure 11:
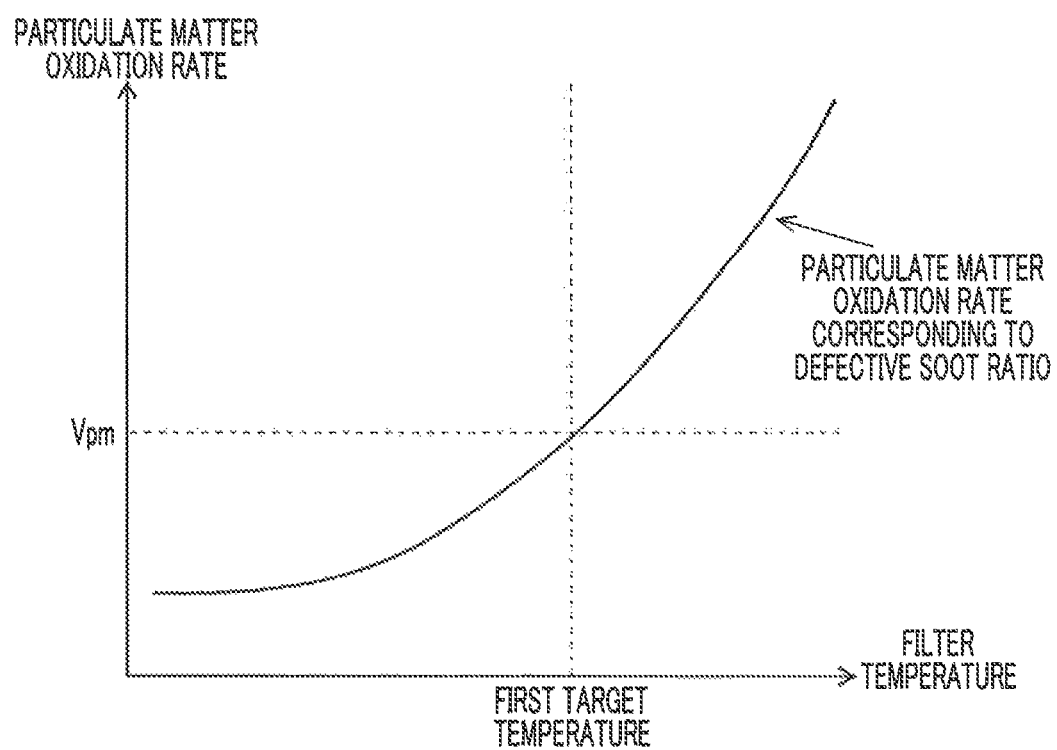
FIG. 11 is a graph that illustrates the procedure of obtaining a particulate matter oxidation rate Vpm at the time of execution of the filter regeneration process on the basis of the relationship between a filter temperature and a regeneration rate, which corresponds to a defective soot ratio, in a second embodiment.

Subsequently, the electronic control unit 10 obtains a particulate matter oxidation rate (Vpm in FIG. 1) at which the temperature of the filter 50a is equal to the first target temperature as shown in FIG. 11 in the relationship between a filter temperature and a particulate matter oxidation rate, obtained in the above-described procedure. The particulate matter oxidation rate Vpm that is obtained in this way may be translated into the amount ΔPM of particulate matter that is oxidized per unit time under a situation that the filter temperature is equal to the first target temperature. The electronic control unit 10 repeatedly executes the process of obtaining the amount of particulate matter remaining in the filter 50a (hereinafter, referred to as particulate matter remaining amount ΣPMra) by subtracting the amount ΔPM of particulate matter that is oxidized per unit time from the particulate matter accumulation amount ΣPM in the filter 50a during execution of the filter regeneration process, and ends the filter regeneration process at the time when the particulate matter remaining amount ΣPMra becomes smaller than or equal to a predetermined completion determination value ΣPMrathr. The particulate matter oxidation rate Vpm in the case where the defective soot ratio is high is higher than the particulate matter oxidation rate Vpm in the case where the defective soot ratio is low, as described above. That is, during execution of the filter regeneration process, the amount ΔPM of particulate matter that is oxidized per unit time in the case where the defective soot ratio is high is larger than the amount ΔPM of particulate matter that is oxidized per unit time in the case where the defective soot ratio is low. Thus, at the time when the filter regeneration process has been executed, a time required for the particulate matter remaining amount ΣPMra to reduce to the predetermined completion determination value ΣPMrathr or smaller (the execution time of the filter regeneration process) in the case where the defective soot ratio is high is shorter than a time required for the particulate matter remaining amount ΣPMra to reduce to the predetermined completion determination value ΣPMrathr or smaller (the execution time of the filter regeneration process) in the case where the defective soot ratio is low. As a result, the execution time of the filter regeneration process is adjusted to the length suitable for the oxidation rate of particulate matter accumulated in the filter 50a.

Hereinafter, in the present embodiment, the procedure of oxidizing and removing particulate matter accumulated in the filter 50a will be described with reference to FIG. 12. FIG. 12 is a flowchart that shows a process routine that is executed by the electronic control unit 10 at the time when particulate matter accumulated in the filter 50a is oxidized and removed. In FIG. 12, the process of S301 is executed instead of the process of S106 in the above-described process routine of FIG. 9, and the processes of S302 to S303 are executed instead of the process of S108 in the process routine of FIG. 9.

Initially, in the process of S301, the electronic control unit 10 computes the amount ΔPM of particulate matter that is oxidized per unit time on the assumption that the filter regeneration process is being executed (on the assumption that the temperature of the filter 50a is equal to the first target temperature). More specifically, the electronic control unit 10 initially computes the speed of change in upstream-downstream differential pressure by dividing the difference (ΔP1−ΔP2) between the upstream-downstream differential pressure ΔP1 read in the process of S102 and the upstream-downstream differential pressure ΔP2 read in the process of S105 by the predetermined time. Subsequently, the electronic control unit 10 converts the speed of change in upstream-downstream differential pressure ΔP to the oxidation rate of defective soot, and computes a defective soot accumulation amount on the basis of the oxidation rate of defective soot and the above-described mathematical expression (I). The electronic control unit 10 computes the defective soot ratio of particulate matter accumulated in the filter 50a by dividing the defective soot accumulation amount by the particulate matter accumulation amount ΣPM. In addition, the electronic control unit 10 computes the amount ΔPM of particulate matter that is oxidized per unit time on the assumption that the filter regeneration process is being executed on the basis of the defective soot ratio, the first target temperature and the above-described correlation shown in FIG. 4.

The electronic control unit 10 proceeds to the process of S107 after executing the process of S301, and starts the filter regeneration process. The electronic control unit 10 executes the processes of S302 to S303 after executing the process of S107. In the process of S302, the electronic control unit 10 computers a particulate matter remaining amount ΣPMra on the basis of the following mathematical expression (2).

$$\Sigma PMra = \Sigma PMraold - \Delta PM \quad (2)$$

In the above mathematical expression (2), ΣPMraold is a particulate matter remaining amount calculated when the process of S302 is executed last time. ΔPM is the amount of particulate matter that is oxidized per unit time, computed in the process of S301.

In the process of S303, the electronic control unit 10 determines whether the particulate matter remaining amount ΣPMra calculated in the process of S302 is smaller than or equal to the above-described predetermined completion determination value ΣPMrathr. When negative determination is made in the process of S303, the electronic control unit 10 returns to the process of S302, and continues execution of the filter regeneration process. On the other hand, when affirmative determination is made in the process of S303, the electronic control unit 10 proceeds to the process of S109, and ends the filter regeneration process.

According to the above-described embodiment, it is possible to set the execution time of the filter regeneration process to the length suitable for the oxidation rate of particulate matter accumulated in the filter 50a. For this reason, it is possible to further efficiently oxidize and remove particulate matter accumulated in the filter 50a.

Particulate matter accumulated in the filter 50a can contain soluble organic fraction. Soluble organic fraction is more easily oxidizable than defective soot. For this reason, the speed of change in upstream-downstream differential pressure ΔP during execution of the pre-regeneration process in the case where soluble organic fraction is accumulated in the filter 50a is higher than the speed of change in the case where soluble organic fraction is not accumulated in the filter 50a. Thus, the execution time of the filter regeneration process, which is adjusted on the basis of the speed of change in upstream-downstream differential pressure ΔP during execution of the pre-regeneration process, in the case where soluble organic fraction is accumulated in the filter 50a is shorter than the execution time of the filter regeneration process in the case where soluble organic fraction is not accumulated in the filter 50a. As a result, the filter regeneration process is ended in a state where the particulate matter remaining amount ΣPMra in the filter 50a is larger than an assumed amount (for example, larger than the above-described predetermined completion determination value ΣPMrathr), so the efficiency of the filter regeneration process can decrease.

Therefore, before execution of the pre-regeneration process, a soluble organic fraction removal process that is the process of oxidizing and removing soluble organic fraction accumulated in the filter 50a may be executed. The soluble organic fraction removal process is the process of raising the temperature of the filter 50a to a temperature that is lower than the second target temperature during execution of the pre-regeneration process and at which the soluble organic fraction oxidizes. At this time, a method of adding fuel from the fuel addition valve 51 to exhaust gas or a method of performing post-injection from the fuel injection valve 3 is used as a method of raising the temperature of the filter 50a, as well as the above-described filter regeneration process or pre-regeneration process.

In this way, when the soluble organic fraction removal process is executed before execution of the pre-regeneration process, it is possible to suppress a decrease in the efficiency of the filter regeneration process due to accumulation of soluble organic fraction. The soluble organic fraction removal process may be definitely executed before execution of the pre-regeneration process irrespective of whether soluble organic fraction is actually contained in particulate matter accumulated in the filter 50a. Instead, the soluble organic fraction removal process may be executed only when it is estimated that the proportion of the amount of soluble organic fraction contained in particulate matter accumulated in the filter 50a (hereinafter, referred to as soluble organic fraction ratio) exceeds a predetermined ratio. At this time, the soluble organic fraction ratio should be estimated on the basis of the history of the operation of the internal combustion engine 1, the history of the temperature of the filter 50a, or the like. The predetermined ratio is such a value that, when the soluble organic fraction ratio at the time when the pre-regeneration process is executed exceeds the predetermined ratio, the efficiency of the filter regeneration process decreases. The predetermined ratio is obtained through adaptation work by utilizing an experiment, or the like, in advance.

What is claimed is:

1. An exhaust gas control system for an internal combustion engine, the exhaust gas control system comprising:
    a filter arranged in an exhaust passage of the internal combustion engine, the filter being configured to collect particulate matter that is emitted from the internal combustion engine;
    a differential pressure sensor configured to detect an upstream-downstream differential pressure in the exhaust passage, the upstream-downstream differential pressure being a differential pressure between an exhaust pressure upstream of the filter and the exhaust pressure downstream of the filter;
    a temperature raising device configured to raise a temperature of the filter; and
    an electronic control unit configured to:
    i) estimate a particulate matter accumulation amount that is an amount of the particulate matter collected in the filter;

ii) execute a pre-regeneration process for a predetermined period when the particulate matter accumulation amount becomes larger than or equal to a predetermined threshold, the pre-regeneration process including a process to raise the temperature of the filter by the temperature rising device to a second target temperature lower than a first target temperature, and the pre-regeneration process including a process to increase a concentration of nitrogen dioxide contained in exhaust gas flowing into the filter by the internal combustion engine; and iii) execute a filter regeneration process after completion of the pre-regeneration process, the filter regeneration process being a process to oxidize and remove the particulate matter collected in the filter by raising the temperature of the filter by the temperature raising device to the first target temperature, the filter regeneration process being executed such that an execution time of the filter regeneration process when a speed of change in a detected value of the differential pressure sensor during execution of the pre-regeneration process is a first speed is shorter than the execution time of the filter regeneration process when the speed of change is a second speed, the first speed being higher than the second speed.

2. The exhaust gas control system according to claim 1, wherein the predetermined period is a time set in advance, the electronic control unit is configured to calculate an amount of change in the detected value of the differential pressure sensor in the predetermined period as a physical quantity that correlates with the speed of change in the detected value of the differential pressure sensor during execution of the pre-regeneration process, and the electronic control unit is configured to execute the filter regeneration process such that the execution time of the filter regeneration process when the amount of change is a first amount is shorter than the execution time of the filter regeneration process when the amount of change is a second amount, the first amount being larger than the second amount.

3. The exhaust gas control system according to claim 1, wherein the predetermined period is a time period from execution of the pre-regeneration process until an amount of change in the detected value of the differential pressure sensor reaches a predetermined amount set in advance, the electronic control unit is configured to set a length of the predetermined period as a physical quantity that correlates with the speed of change in the detected value of the differential pressure sensor during execution of the pre-regeneration process, and the electronic control unit is configured to execute the filter regeneration process such that the execution time of the filter regeneration process when the length of the predetermined period is a first length is shorter than the execution time of the filter regeneration process when the length of the predetermined period is a second length, the first length being shorter than the second length.

4. The exhaust gas control system according to claim 1, wherein the electronic control unit is configured to, on a basis of such a characteristic that an oxidation rate of the particulate matter accumulated in the filter when the speed of change in the detected value of the differential pressure sensor during execution of the pre-regeneration process is the first speed is higher than the oxidation rate of the particulate matter accumulated in the filter when the speed of change is the second speed and the oxidation rate of the particulate matter accumulated in the filter when the temperature of the filter is a first temperature is higher than the oxidation rate of the particulate matter accumulated in the filter when the temperature of the filter is a second temperature, the first temperature being higher than the second temperature, set a relationship between the temperature of the filter and the oxidation rate of the particulate matter accumulated in the filter, the relationship corresponding to the speed of change in the detected value of the differential pressure sensor during execution of the pre-regeneration process, the electronic control unit is configured to calculate the oxidation rate of the particulate matter when the temperature of the filter is equal to the first target temperature on the basis of the set relationship, the electronic control unit is configured to calculate an amount of the particulate matter remaining in the filter during execution of the filter regeneration process on the basis of the oxidation rate of the particulate matter, and the electronic control unit is configured to, when the amount of the particulate matter remaining in the filter becomes smaller than or equal to a predetermined completion determination value, end the filter regeneration process.

5. The exhaust gas control system according to claim 1, wherein the electronic control unit is configured to execute a soluble organic fraction removal process before executing the pre-regeneration process as a process of oxidizing and removing soluble organic fraction accumulated in the filter by raising the temperature of the filter by the temperature raising device to a third target temperature that is a temperature that is lower than the second target temperature and at which the soluble organic fraction oxidizes.

* * * * *